(12) United States Patent
Igarashi

(10) Patent No.: US 6,207,226 B1
(45) Date of Patent: Mar. 27, 2001

(54) METALLIC COATING METHOD

(75) Inventor: Hiroshi Igarashi, Yokohama (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/140,012

(22) Filed: Aug. 26, 1998

(30) Foreign Application Priority Data

Aug. 26, 1997 (JP) ..................................... 9-228675

(51) Int. Cl.[7] ............... B05D 1/36; B05D 5/06; B05D 7/16
(52) U.S. Cl. .......... 427/195; 427/203; 427/205; 427/404; 427/407.1; 427/409; 106/404
(58) Field of Search .................. 427/202, 203, 427/205, 195, 201, 404, 407.1, 409; 106/404

(56) References Cited

U.S. PATENT DOCUMENTS

| | | | |
|---|---|---|---|
| 2,878,141 | * 3/1959 | Canniff . | |
| 3,655,569 | * 4/1972 | Hellsten et al. | 252/99 |
| 4,243,565 | * 1/1981 | Nishino et al. | 260/22 CQ |
| 4,350,535 | * 9/1982 | Ishijima et al. | 106/308 Q |
| 4,453,982 | * 6/1984 | Wilfinger et al. | 106/308 M |
| 4,565,716 | * 1/1986 | Williams, Jr. et al. | 427/216 |
| 5,156,677 | * 10/1992 | Carpenter et al. | 106/404 |
| 5,439,710 | * 8/1995 | Vogt et al. | 427/409 |
| 5,466,286 | * 11/1995 | Briselli et al. | 106/404 |
| 5,780,113 | * 7/1998 | Masuda et al. | 427/409 |
| 5,830,581 | * 11/1998 | Masuda et al. | 428/463 |

* cited by examiner

Primary Examiner—Erma Cameron
(74) Attorney, Agent, or Firm—Wenderoth, Lind & Ponack, L.L.P.

(57) ABSTRACT

The invention discloses a metallic coating method which is characterized by applying a dispersion formed by dispersing aluminum flakes which have been surface-treated with a $C_8$–$C_{18}$ alky ester of phosphoric acid in an organic solvent, onto an uncured coated surface of a paint-coated object, then applying onto the dispersion-applied surface a clear paint, and thereafter simultaneously curing these coating films under heating. According to this method, the aluminum flakes are oriented in parallel with the coated surface, enabling to form a metallic coating film which is white and excels in metallic luster (glittering effect) and furthermore exhibits strong flip-flop properties.

12 Claims, No Drawings

METALLIC COATING METHOD

This invention relates to a novel metallic coating method.

A metallic coating finishing method by "2 coat-1 bake" system is known, which comprises applying a metallic paint containing a paint resin composition and aluminum flakes onto a substrate, further applying onto the uncured metallic paint-coated surface a clear paint which forms a transparent coating film, and then curing this two-layered coating film simultaneously by heating, and the technique has been widely used for top coating of automobile body panels and the like. The metallic coating film exhibits glittering brilliancy and excels in designability.

It is ideal for aluminum flakes in this metallic coating film to be oriented in parallel with the coated surface. In reality, however, they often are oriented irregularly and it is difficult to form a metallic coating film retaining the excellent white, metallic luster inherent in aluminum flakes and moreover having strong flip-flop properties.

I have engaged in extensive studies in search for a method for forming a metallic coating film in which aluminum flakes are oriented in parallel with the coated surface, which excels in whiteness and metallic luster (glittering effect) and moreover has strong flip-flop properties. In consequence, I now discovered: by formulating a dispersion of aluminum flakes, which have been treated (coated) with a specific phosphoric acid alkyl ester, in an organic solvent and applying the same to the surface coated with uncured paint film, aluminum flakes are oriented in parallel with the coated surface to accomplish the intended effect. The present invention is thus completed.

According to the present invention, therefore, a metallic coating method is provided, which method is characterized by applying a dispersion formed by dispersing aluminum flakes which have been surface-treated with a $C_8$–$C_{18}$ alkyl ester of phosphoric acid in an organic solvent, onto uncured coated surface of a paint-coated object, then applying onto the dispersion-applied surface a clear paint and thereafter applying heat to simultaneously cure these coating films.

The method of this invention is capable of forming a metallic coating film which is white and excellent in metallic luster (glittering effect) and moreover has strong flip-flop properties. Here "strong flip-flop properties" means: when the aluminum flake-containing metallic coating film is observed, from the frontal direction (at a right angle to the coated surface) it appears white and glitters to produce excellent brilliancy. Whereas, from diagonal directions the brilliancy is less and the coated surface appears dark, largely differing from the former case. That is, a metallic coating film whose metallic effect markedly varies depending on the angle of observation is said to have "strong flip-flop properties". Such a coating film is rich in designability.

In the method of the present invention, "uncured, coated surface" of the coating object onto which a paint has been applied corresponds to the surface of the coating object to be applied with a dispersion of aluminum flakes in organic solvent, said aluminum flakes having been surface-treated with a $C_8$–$C_{18}$ alkyl ester of phosphoric acid. While this surface may be formed by applying an air drying type base paint, it is generally preferred to form it by applying a thermosetting base paint (A) which comprises, for example, a base resin, crosslinking agent and organic solvent.

Examples of the base resin to be used in said base paint (A) include resins having crosslinkable functional groups like hydroxyl groups, eg., polyester resin, alkyd resin, acrylic resin and vinyl resin. As the crosslinking agent, compounds or resins crosslinkable with the functional groups, such as melamine resin and optionally blocked polyisocyanate compound can be used. As the organic solvent, any of customarily used solvents for paints such as hydrocarbon type, ester type, ether type, alcohol type and ketone type solvents can be used. Generally suitable blend ratios of such base resin to crosslinking agent in the base paint (A) are such that, based on the total weight of solid contents of the two components, the base resin is within a range of 50–90%, in particular, 60–85%, and the crosslinking agent, 50–10%, in particular, 40–15%.

Besides said base resin, crosslinking agent and organic solvent, if necessary other additives such as coloring pigment, brilliant pigment, extender, curing catalyst, face regulator, anti-oxidant, flowability-regulating agent, pigment disperser and the like may be suitably blended into the base paint (A).

According to the method of the present invention, the base paint (A) is directly applicable to metallic or plastic coating objects such as automobile body panels, or onto a substrate which has been applied with an undercoat such as an electropaint and optionally with a surfacer, and cured.

Said base paint (A) is preferably applied to such surfaces of coating objects by such means as electrostatic coating, airless spray, air spray or the like, to a thickness, in terms of cured coating film thickness, of from about 1 to about 45 μm, in particular, from about 10 to about 30 μm.

Said "uncured coated surface" onto which a dispersion (B) of aluminum flakes in organic solvent is to be applied, said aluminum flakes having been surface-treated with a $C_8$–$C_{18}$ alkyl ester of phosphoric acid in accordance with the present invention, may be one which has been applied with uncured coating of above-described base paint (A). More specifically a surface coated with the base paint (A) and subsequently allowed to stand for several minutes or more at room temperature is preferred. Whereas, when the coated surface is further subjected to a compulsory drying at 50–100° C. for 1–30 minutes after the air drying, the resulting coated surface (preferably having a gel ratio not higher than 60% by weight, in particular, not higher than 40% by weight) also is included in the "uncured coated surface" according to the present invention. Here the "gel ratio" is determined as follows: a coating film after the compulsory drying is extracted with acetone at reflux temperature for 5 hours, and the residual ratio of the coating film after the extraction versus before the extraction is expressed by % by weight.

The dispersion (B) to be applied onto the "uncured coated surface" is prepared by dispersing aluminum flakes which have been surface-treated with a $C_8$–$C_{18}$ alkyl ester of phosphoric acid in an organic solvent.

Aluminum flakes to be used in said dispersion (B) can be those known per se, for example, metal aluminum which is mechanically crushed into flakes by stamp mill process, dry ball mill process, wet ball mill process or the like; and also leafing type and non-leafing type aluminum flakes whose surfaces are coated with long chain fatty acid such as stearic acid, oleic acid and the like which is used as a lubricant in the occasion of crushing. Generally preferred size of these aluminum flakes is such that their longitudinal length is within a range of 2–50 μm, in particular, 10–30 μm and thickness, within a range of 0.1–2 μm, in particular, 0.3–1 μm.

As the $C_8$–$C_{18}$ alkyl esters of phosphoric acid which are used for surface treatment (coating) of the aluminum flakes, compounds expressed by a formula

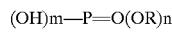

(in which m is 1 or 2, n is 1 or 2, m+n being 3, and R is a $C_8$–$C_{18}$ preferably $C_{12}$–$C_{18}$, straight chain or branched chain alkyl group) are suitable, specific examples including dinonanoic acid phosphate, dioctanoic acid phosphate, dilaury acid phosphate, monolauril acid phosphate, ditridecyl acid phosphate, monotridecyl acid phosphate, distearyl acid phosphate, monostearyl acid phosphate, diisostearyl acid phosphate, monoisostearyl acid phosphate, dioleyl acid phosphate and monooleyl acid phosphate, which can be used either alone or in combination of two or more.

As methods for surface-treating aluminum flakes using above phosphoric acid alkyl esters, for example, the following may be used:

(1) to conduct aforesaid crushing step of aluminum in the presence of said phosphoric acid alkyl ester and optionally in the concurrent presence of a lubricant such as oleic acid, stearic acid or the like, whereby forming the aluminum flakes; or (2) to mix crushed aluminum flakes, if desired, in the presence of a lubricant like oleic acid or stearic acid, with an organic solvent to form a paste, which is then blended and stirred with phosphoric acid alkyl ester.

In the methods as above-described, the blend ratio (treating amount or coating amount) of the phosphoric acid alkyl ester to the aluminum flakes is suitably within a range of generally 1–20 parts by weight, in particular, 1.5–15 parts by weight, inter alia, 2–10 parts by weight, per 100 parts by weight of aluminum flakes.

As the organic solvent in which said aluminum flakes which have been surface-treated with $C_8$–$C_{18}$ alkyl esters of phosphoric acid are to be dispersed, those customarily used for paints can be used, examples thereof including: hydrocarbon-type such as hexane, heptane, xylene, toluene and cyclohexane; ester-type such as methyl acetate, ethyl acetate, ethylene glycol mono-methyl ether acetate and diethylene glycol monomethyl ether acetate; ether-type such as isopropylether, ethylene glycol monomethyl ether and diethylene glycol monobutyl ether; alcohols such as methyl alcohol, ethyl alcohol, butyl alcohol and hexyl alcohol; and ketone-type such as methyl isobutyl ketone, methyl ethyl ketone, isophorone and acetophenone.

The ratio between the aluminum flakes which have been surface treated with such phosphoric acid alkyl ester and organic solvent is variable depending on, for example, the kind of the uncured coated surface. Whereas, generally preferred ratio is such that, based on the total sum of these two components, the former is within the range of 1–50%, in particular, 2–10%, inter alia, 2–7% and the latter, 99–50%, in particular, 98–90%, inter alia, 98–93%, the percentages being by weight.

Dispersion (B) is basically one formed by dispersing aluminum flakes which have been surface-treated with the phosphoric acid alkyl ester in organic solvent. If necessary, it is permissible to further blend thereinto thermosetting paint resin composition, coloring pigment, extender and the like, in such amounts as will not substantially affect orientability of the aluminum flakes.

Examples of said thermosetting paint resin composition which may be added to dispersion (B) include: compositions comprising a base resin such as acrylic resin, polyester resin and alkyd resin which have crosslinkable functional groups, eg., hydroxyl groups, carboxyl groups and epoxy groups; and cross-linking agent which is reactable with these functional groups. As the crosslinking agent, partially or fully etherified melamine resin, imino-containing melamine resin, optionally blocked polyisocyanate compound, carboxyl-containing compound or epoxy-containing compound can be used. Suitable ratio of said base resin to the crosslinking agent in such a composition is such that, based on the total weight of the two components, the former is within a range of 50–90%, in particular, 55–80% and the latter, 50–10%, in particular, 45–20%, percentages being by weight.

The amount of such a paint resin composition to be blended into the dispersion (B) is generally no more than 100 parts, preferably 1–50 parts, in particular, 2–20 parts, per 100 parts (solid content) of the aluminum flakes which have been surface-treated with the phosphoric acid alkyl ester, parts being by weight.

In the method of the present invention, the dispersion (B) can be applied to the "uncured coated surface" with base paint (A), by such means as electro-static coating, airless spray, air spray and the like. Suitable thickness of its coating film (consisting either of the aluminum flakes only or optionally containing still other solid) is within a range of from about 0.5 to about 5 $\mu$m, in particular, from about 0.8 to about 2 $\mu$m, in terms of cured film thickness.

When said dispersion (B) is applied to the "uncured coated surface", the organic solvent contained in the dispersion (B) penetrates into the "uncured coated surface" of the lower layer and/or evaporates off. Thus, in the coated film formed of the dispersion (B) concentration of the aluminum flakes increases, and the aluminum flakes can be aligned uniformly and densely, and are more readily oriented in the direction parallel to the uncured coated surface. In consequence, it becomes possible to form metallic coating film which is white, excels in metallic luster and has strong flip-flop properties, an achievement which has never been attained with metallic coating films formed of conventional aluminum flake-containing paints. Morever, because the dispersion (B) is applied to the "uncured coated surface" by customarily employed methods, there is no need to largely change the conventional coating steps.

According to the method of the present invention, the "uncured coated surface" onto which the dispersion (B) is applied is subsequently allowed to stand at room temperature, or further subjected to a compulsory drying at 50–100° C. for 1–30 minutes, and while the coating films are still uncured, clear paint (C) is applied onto the surface coated with the dispersion (B).

Clear paint (C) is preferably a per se known organic solvent-type thermosetting paint containing a base resin, crosslinking agent and organic solvent, and if necessary also solid color pigment, metallic pigment, iridescent pigment, ultraviolet absorbing agent and the like, which has transparency of a degree as will allow perception of the metallic effect of the coating film of dispersion (B) through the coating film formed of the clear paint.

Examples of base resins useful for clear paint (C) include acrylic resin, polyester resin, alkyd resin, fluorine-containing resin, urethane resin and silicon-containing resin which contain crosslinkable functional groups such as hydroxyl group, carboxyl group, silanol group, epoxy group and the like. In particular, acrylic resins containing such crosslinkable functional groups are preferred. As the crosslinking agent, for example, melamine resin, urea resin, optionally blocked polyisocyanate compound, epoxy compound or resin, carboxyl-containing compound or resin, acid anhydride group- or alkoxysilane group-containing compound or resin which are reactable with these functional groups may be named. As the melamine resin, those preferred are partially or fully etherified melamine resins with $C_1$–$C_8$ monohydric alcohols, having 1 to 5 triazine rings.

Such clear paint (C) is obtained by mixing and dispersing said base resin and crosslinking agent in an organic solvent for paint. It is permissible to further blend such additional components as, eg., coloring pigment, metallic paint, ultraviolet absorber and the like into the paint.

A clear paint (C) whose solid component concentration is adjusted to about 30—about 80% by weight at the application time is applied onto an uncured surface coated with said dispersion (B) by electrostatic system or spray system to a thickness of from about 5 to about 100 μm, preferably from about 20 to about 80 μm, in terms of cured coating film. Then the coating object is heated at about 100 to about 180° C. for about 10 to about 40 minutes, whereby curing the coating films of the base paint (A), dispersion (B) and clear paint (C) simultaneously. Thus a metallic coating film according to the present invention can be formed.

According to the above-described method of the present invention, in the three-layered coating film composed of those of the base paint (A), dispersion (B) and clear paint (C), concentration of the aluminum flakes in the coating film of the dispersion (B) can be increased, so that the aluminum flakes are ready to be oriented uniformly and densely on the base paint (A)-coated surface, and furthermore in the direction parallel with the coated surface. In consequence, a metallic coating film which is white, excels in metallic luster and exhibits strong flip-flop properties as compared with conventional metallic coating films formed with use of aluminum flakes can be formed.

Hereinafter the invention is more specifically explained, referring to working and comparative examples, in which parts and percentages are by weight.

1. Samples

1) Coating object:

Onto a dull steel sheet of 0.8 mm in thickness which had been given a zinc phosphate treatment, a thermosetting epoxy resin-type cationic electropaint (Elecron® 9600, Kansai Paint) was electrodeposited to a cured film thickness of about 20 μ and cured under heating at 170° C. for 30 minutes. Then a surfacer for automobiles (a thermosetting polyester resin-melamine resin-organic solvent system, "TP-37 Primer Surfacer": Kansai Paint, tradename) was applied onto the cured coating film to a thickness of about 25 μ, in terms of a cured film thickness, by air spray coating, followed by 3 minutes' standing at room temperature and 30 minutes' heating at 140° C. to cure the surfacer film. Thus the coating object to be used in the subsequent tests was prepared.

2) Base paint (A)

(A-1):

A hydroxyl-containing acrylic resin (*1) 75 parts and butyl etherified melamine resin (*2) 25 parts were mixed with, and dispersed in, organic solvent (toluene/ethyl acetate/"Swaso® 1500" (*3) at weight ratios of 50/30/20), and the viscosity was adjusted to 13 seconds/Ford (viscosity) cup #4/20° C.

(*1) hydroxyl-containing acrylic resin: a polymer obtained through copolymerization of methyl methacrylate 38%, ethyl acrylate 17%, n-butyl acrylate 17%, hydroxyethyl methacrylate 7%, lauryl methacrylate 20% and acrylic acid 1%, which had a number-average molecular weight of 50,000 and a hydroxyl value of 54 mgKOH/g.

(*2) butyl-etherified melamine resin: "U-van® 28–60" (Mitsui Toatsu Chemical, Inc.)

(*3) "Swasol® 1500" (Cosmo Oil Co., a petroleum aromatic hydrocarbon solvent)

3) Dispersion (B):

(B-1)

One-hundred (100) parts of aluminum flakes of 12 μm in longitudinal length which had been obtained by pulverization in the presence of oleic acid (lubricant) were mixed with, and dispersed in, an equal weight mixture (2.5 parts) of dilauryl acid phosphate and monolauryl acid phosphate and xylene (200 parts), and allowed to stand at room temperature for 10 minutes to form an aluminum paste.

(B-2)

One-hundred (100) parts of aluminum flakes of 16 μm in longitudinal length which had been obtained through pulverization in the presence of oleic acid (lubricant) were mixed with, and dispersed in, an equal weight mixture (5 parts) of dilauryl acid phosphate and monolauryl acid phosphate and xylene (200 parts), and allowed to stand at room temperature for 10 minutes to form an aluminum paste.

(4) Clear paint (C)

(C-1)

A hydroxyl-containing acrylic resin (*4) 70 parts, a melamine resin (*2) 30 parts, Tinuvin® 900 (tradename: Ciba Geigy, an ultraviolet absorbent) 1 part and BYX®300 (tradename: BYK Chemie, a surface regulator), parts being by weight, were mixed and dispersed in a hydrocarbon-type solvent, SWASOL® 1000 (tradename: Cosmo Oil Co.), and the viscosity of the dispersion was adjusted to 25 seconds/Ford (viscosity) cup #4/20° C.

(*4) hydroxyl-containing acrylic resin: a polymer obtained through copolymerization of styrene 20%, hydroxylethyl methacrylate 20%, n-butyl acrylate 20%, n-butyl methacrylate 30% and 2-ethylhexyl acrylate 10%, percentages being by weight; said polymer having a number-average molecular weight of about 5,000.

2. EXAMPLES AND COMPARATIVE EXAMPLES

Onto the cured surfacer-coated surface of the coating object, a base paint (A), dispersion (B) and clear paint (C) were applied wet-on-wet, followed by a heating at 140° C. for 30 minutes to cure these multi-layers in the coating film simultaneously.

These coating steps and the results of performance test of the multi-layered coating film are shown in Table 1. In said Table 1, (*5) is a metallic paint formed by dispersing 10 parts by weight of aluminum flakes having a longitudinal length of 12 μm, per 100 parts by weight of the solid resin content of base paint (A-1), whose viscosity was adjusted to the same to that of said base paint (A-1).

|  |  | Example | | Comparative Example |
|---|---|---|---|---|
|  |  | 1 | 2 | 1 |
| Base paint | Sample code | A-1 | A-1 | (*5) |
|  | Film thickness | 20 | 20 | 20 |
|  | Drying | room temp. 5 min. | | |
| Dispersion | Sample code | B-1 | B-2 | — |
|  | Film thickness | 1 | 1 | — |
|  | Drying | room temp. 5 min. | | |
| Clear paint | Sample code | C-1 | C-1 | C-1 |
|  | Film thickness | 40 | 40 | 40 |
|  | Heating | 140° C., 30 min. | | |
| Test result |  |  |  |  |
| Appearance |  | ◯ | ◯ | Δ |
| IV |  | 280 | 300 | 180 |

*Film thickness is that of cured film: unit by μm.

Test method

Appearance: Density of aluminum flakes and their brilliancy were visually observed and graded according to the following standard:

○; excellent in density and brilliancy

Δ; inferior in density and brilliancy

X; markedly inferior in density and brilliancy

IV: IV values were measured by laser radiation with ALCOPE LMR®-200 (tradename: Kansai Paint Co.). "IV value" refers to brightness or darkness of metallic coating film, which indicates luminance, lightness and intensity of metallic luster. The greater the value, the higher those properties.

What is claimed is:

1. A metallic coating method which comprises applying a dispersion formed by dispersing aluminum flakes which have been surface-treated with a $C_8$–$C_{18}$ alkyl ester of phosphoric acid in an organic solvent, onto an uncured coated surface of a paint-coated object, then applying onto the dispersion-applied surface a clear paint, and thereafter simultaneously curing these coating films under heating.

2. A method according to claim 1 in which said $C_8$–$C_{18}$ alkyl esters of phosphoric acid are the compounds expressed by the following formula,

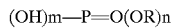

in which m is 1 or 2, n is 1 or 2 and m+n is 3; and R is a $C_8$–$C_{18}$ straight chain or branched chain alkyl group.

3. A method according to claim 2, in which R is a $C_{12}$–$C_{18}$ straight chain or branched chain alkyl group.

4. A method according to claim 1, in which the ratio of the surface-treated aluminum flakes to the organic solvent in said dispersion is such that, based on the total sum of these two components, the former is within a range of 1–50% by weight, and the latter, within that of 99–50% by weight.

5. A method according to claim 4, in which the ratio of the surface-treated aluminum flakes to the organic solvent in said dispersion is such that, based on the total sum of these two components, the former is within a range of 2–7% by weight, and the latter, within that of 98–93% by weight.

6. A method according to claim 1, in which the film thickness of the applied dispersion is within a range of from about 0.5 to about 5 µm, in terms of its dried film thickness.

7. A method according to claim 1, in which the paint for forming the uncured coated surface of the coating object is a thermosetting base paint comprising a base resin, crosslinking agent and an organic solvent.

8. A method according to claim 7, in which the coated film thickness of the thermosetting base paint is within a range of from about 1 to about 45 µm, in terms of its cured film thickness.

9. A method according to claim 1, in which the clear paint is an organic solvent thermosetting paint comprising a base resin, crosslinking agent and organic solvent, and further optionally solid color pigment, metallic pigment, iridescent pigment, and ultraviolet absorbent as blended therein.

10. A method according to claim 1, in which the coated film thickness of the clear paint is within a range of from about 5 to about 100 µm, in terms of its cured film thickness.

11. A method according to claim 1, in which the formed multi-layer coating film is cured under heating at temperatures of about 100–180° C. for about 10 to about 40 minutes.

12. The articles coated by the method of claim 1.

* * * * *